(12) United States Patent
Ishchenko et al.

(10) Patent No.: US 9,053,020 B2
(45) Date of Patent: Jun. 9, 2015

(54) ONLINE PROTECTION COORDINATION FOR DISTRIBUTION MANAGEMENT SYSTEM

(71) Applicant: ABB Research Ltd., Zurich (CH)

(72) Inventors: Dmitry Ishchenko, Cary, NC (US); Zhao Li, Raleigh, NC (US); James D. Stoupis, Durham, NC (US); Martin Bass, Cary, NC (US); William L. Peterson, Fulshear, TX (US); M. Gamini Wickramasekara, Raleigh, NC (US)

(73) Assignee: ABB Research Ltd., Zurich (CH)

( * ) Notice: Subject to any disclaimer, the term of this patent is extended or adjusted under 35 U.S.C. 154(b) by 287 days.

(21) Appl. No.: 13/649,701

(22) Filed: Oct. 11, 2012

(65) Prior Publication Data

US 2014/0108851 A1    Apr. 17, 2014

(51) Int. Cl.
| | |
|---|---|
| *G06F 11/00* | (2006.01) |
| *G06F 11/07* | (2006.01) |
| *H02H 3/00* | (2006.01) |
| *H02H 7/28* | (2006.01) |

(52) U.S. Cl.
CPC ............... *G06F 11/07* (2013.01); *H02H 3/006* (2013.01); *H02H 7/28* (2013.01)

(58) Field of Classification Search
USPC .................................................. 714/4.1, 25
See application file for complete search history.

(56) References Cited

U.S. PATENT DOCUMENTS

| | | |
|---|---|---|
| 6,018,449 A | 1/2000 | Nelson et al. |
| 6,111,735 A | 8/2000 | Nelson et al. |
| 6,243,244 B1 | 6/2001 | Nelson et al. |
| 6,341,054 B1 | 1/2002 | Walder et al. |

(Continued)

FOREIGN PATENT DOCUMENTS

| | | |
|---|---|---|
| CN | 101752905 A | 6/2010 |
| KR | 20090032397 A | 4/2009 |
| WO | 0048283 A1 | 8/2000 |

OTHER PUBLICATIONS

Greer, Richard et al., "Distribution Automation Systems With Advanced Features", IEEE 2011, Rural Electric Power Conference, Chattanooga, TN, Apr. 10-13, 2011, 1-15.

(Continued)

*Primary Examiner* — Sarai Butler

(74) *Attorney, Agent, or Firm* — Murphy, Bilak & Homiller, PLLC

(57) ABSTRACT

A method for automatic protection coordination in a power system network comprises identifying radial source-to-load paths and fault protection devices in the source-to-load paths, for a portion of the power system network to be coordinated. Device settings data for fault protection devices are retrieved, including multiple preconfigured settings for some devices. Fault currents for each of multiple possible electrical faults in said portion of the power system network are predicted, and a selectivity check for each pair of fault protection devices that are adjacent to one another in an identified radial source-to-load path is performed, for each of one or more of the predicted fault currents, taking into account multiple preconfigured settings for remotely controllable fault protection devices. A combination of settings for remotely controllable fault protection devices that minimizes selectivity violations among the pairs is selected, and necessary change-setting commands are sent to remotely controllable fault protection devices.

25 Claims, 5 Drawing Sheets

(56) References Cited

U.S. PATENT DOCUMENTS

| | | |
|---|---|---|
| 6,347,027 B1 | 2/2002 | Nelson et al. |
| 6,697,240 B2 | 2/2004 | Nelson et al. |
| 6,707,655 B2 | 3/2004 | McElray, Sr. et al. |
| 6,868,311 B2 | 3/2005 | Chiang et al. |
| 7,233,843 B2 | 6/2007 | Budhraja et al. |
| 7,525,782 B1 | 4/2009 | Hedrick et al. |
| 7,693,608 B2 | 4/2010 | Nasle |
| 7,729,808 B2 | 6/2010 | Nasle et al. |
| 7,757,166 B2 | 7/2010 | Nelson et al. |
| 7,826,990 B2 | 11/2010 | Nasle et al. |
| 7,840,395 B2 | 11/2010 | Nasle et al. |
| 7,840,396 B2 | 11/2010 | Radibratovic et al. |
| 7,844,439 B2 | 11/2010 | Nasle et al. |
| 7,844,440 B2 | 11/2010 | Nasle et al. |
| 7,916,627 B2 | 3/2011 | Berkowitz et al. |
| 8,036,872 B2 | 10/2011 | Nasle |
| 8,060,259 B2 | 11/2011 | Budhraja et al. |
| 8,126,685 B2 | 2/2012 | Nasle |
| 8,131,401 B2 | 3/2012 | Nasle |
| 8,155,908 B2 | 4/2012 | Nasle et al. |
| 8,155,943 B2 | 4/2012 | Nasle |
| 8,165,723 B2 | 4/2012 | Nasle |
| 8,170,856 B2 | 5/2012 | Nasle |
| 8,180,622 B2 | 5/2012 | Nasle |
| 8,229,722 B2 | 7/2012 | Nasle |
| 2003/0161084 A1* | 8/2003 | Potts et al. ............. 361/62 |
| 2007/0239373 A1 | 10/2007 | Nasle |
| 2008/0262820 A1 | 10/2008 | Nasle |
| 2008/0263469 A1 | 10/2008 | Nasle et al. |
| 2009/0083019 A1 | 3/2009 | Nasle |
| 2009/0105998 A1 | 4/2009 | Radibratovic et al. |
| 2009/0113049 A1 | 4/2009 | Nasle et al. |
| 2009/0149972 A1 | 6/2009 | Nasle |
| 2009/0290275 A1 | 11/2009 | Staszesky et al. |
| 2010/0168931 A1 | 7/2010 | Nasle |
| 2010/0268396 A1 | 10/2010 | Nasle et al. |
| 2012/0022707 A1 | 1/2012 | Budhraja et al. |
| 2012/0120790 A1 | 5/2012 | Berkowitz et al. |
| 2012/0265360 A1* | 10/2012 | Smit ............. 700/293 |

OTHER PUBLICATIONS

Unknown, Author, "e-terradistribution Network Analysis", Alstom Grid, Network Management Solutions, publication date unknown, 1-4.

* cited by examiner

ONLINE PROTECTION COORDINATION FOR DISTRIBUTION MANAGEMENT SYSTEM

TECHNICAL FIELD

The instant application relates to electric power systems, and more particularly to techniques for providing coordinated fault protection and power distribution system recovery.

BACKGROUND

Electric power utilities in the US and around the world are currently in the process of upgrading their distribution systems to simplify and automate system operation by implementing enhanced monitoring, distribution automation and control solutions. The ultimate goal from a distribution system operations standpoint, as stated by many utilities in their roadmaps to the so-called Smart Grid, is to achieve smart, self-healing grids. These grids should be capable of automatic isolation of permanent faults and automatic system reconfiguration, to quickly restore power to as many customers as possible by switching affected customers over to alternative sources of power in the event of an interruption.

This goal can be achieved within the distribution management system (DMS) framework by adding various smart sensors, integrating sensor and meter data into decision making process, and using advanced hybrid (wired/wireless) communications infrastructure, to implement automatic fault location, isolation and load restoration schemes. However, this flexibility introduces some new problems in systems operation. In particular, automatic network reconfiguration may result in situations where Intelligent Electronic Devices (IEDs) such as substation relays and field reclosers that have been pre-configured to protect the system from abnormal conditions may no longer provide selective operation, i.e., operation that ensures that only those fault protection devices closest to a fault are triggered. In a new configuration created by an automatic recovery system, these devices may fail to operate during faults, or can mis-operate and create nuisance trips during normal operation conditions. Accordingly, improved techniques for fault protection coordination are needed.

SUMMARY

Embodiments of the present invention include techniques for automatic online protection coordination in a Distribution Management System (DMS). In some embodiments, these techniques use a DMS network model to analyze currents and all possible network topologies created as the result of automated grid switching, and perform load flow, short-circuit and protection coordination analysis. After the analysis is complete, changes in protection coordination in the network are automatically implemented through online communication, e.g., using supervisory control and data acquisition (SCADA)-based communication. Control actions may include switching one or more remotely controllable protection devices to new Setting Groups that have been determined to provide adequate selectivity at the analysis stage, or by directly modifying the protection device settings if pre-configured settings for the remotely controllable devices are not adequate.

An example method according to several embodiments of the invention is a method for automatic protection coordination in a power system network that includes one or more power sources and multiple fault protection devices, wherein a plurality of the fault protection devices are remotely controllable and have multiple preconfigured settings. This example method begins with the identification of radial source-to-load paths and fault protection devices in the identified source-to-load paths, for a portion of the power system network to be coordinated. This identification operation is based on stored topology data for the network, and may in some cases be based on a network model topology that reflects a change or proposed change to the network configuration resulting from an automatic restoration process. This identifying operation may in some cases be performed in response to an outage event in the power system network.

The example process continues with the retrieval of protection device settings data for the identified fault protection devices in the relevant portion of the network, including the pre-configured setting groups for any remotely controllable fault protection devices. The protection device settings data for identified fault protection devices may comprise only a single time-current characteristic for some non-remotely controllable fault protection devices, but comprise two or more distinct time-current characteristics for each of several remotely controllable fault protection devices, where each of the two or more time-current characteristics for these remotely controllable fault protection device corresponds to one of the multiple preconfigured settings for the corresponding device.

The protection device settings are then used to calculate predicted fault currents for each of a plurality of possible electrical faults in said portion of the power system network, based on the stored topology data. In some cases, this includes predicting fault currents for each of a plurality of fault types at each of a plurality of nodes in the portion of the network to be coordinated. These fault types may include some or all of the following: a three-phase fault; a line-to-line fault; a line-to-ground fault; and a line-to-line-to-ground fault.

A selectivity check is performed for each pair of fault protection devices that are adjacent to one another in an identified radial source-to-load path, for each of one or more of the predicted fault currents, taking into account the multiple preconfigured settings for the remotely controllable fault protection devices. For a given pair of fault protection devices where each has multiple preconfigured settings, this may comprise identifying all combinations of settings for the pair that do not present a selectivity violation. In some systems, the selectivity check involves evaluating selectivity at each of multiple currents in a range extending up to the predicted fault current, for at least one pair of devices and for at least one predicted fault current. Further, in some systems the selectivity check performed for at least one pair of fault protection devices is based on a pre-determined coordination time interval, where the coordination time interval defines a minimum time separation between time-current characteristics of coordinated devices at each predicted fault current.

The results of these selectivity checks are used to select a combination of settings for remotely controllable fault protection devices. A combination of settings that minimizes selectivity violations among the pairs is selected. If possible, a combination for which no selectivity violations exist is chosen. If no such combination exists, then a combination that minimizes an aggregate violation of coordination time intervals is selected, in some systems. In other systems, a combination for which a minimum number of selectivity violations exist is selected, instead. Some systems may be configured to, after determining that there is no combination for which no selectivity violations exist, select a combination for which a minimum number of selectivity violations exist and generate a suggested new setting for a first one of the remotely programmable fault protection devices, wherein said suggested new setting would reduce the number of selectivity violations. In some cases this suggested new setting is sent to a system operator. Other systems may be configured to automatically proceed with sending a reconfiguration command to the remotely programmable fault protection device, to set the first one of the remotely programmable fault protection devices to the new setting.

Finally, a change-setting command is sent to each of the remotely controllable fault protection devices for which settings have changed, based on the selected combination of settings. The change-setting commands may be sent using SCADA, for example.

The example process summarized above may be triggered by a restoration switching process, in some cases. Thus, the process outlined above may be preceded, in some cases, by the detection of a fault in the power system network and the automatic generation of a restoration switching sequence plan, based on the identified fault. In these cases, the identifying, calculating, performing, selecting and sending operations summarized above are performed in response to said detecting and are based on stored topology data that reflects network changes due to the restoration switching sequence plan.

Further embodiments of the invention include a computerized system configured to carry out one or several of the techniques summarized above. Those skilled in the art will recognize still further embodiments, as well as additional features and advantages of several of these embodiments, upon reading the following detailed description and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

DETAILED DESCRIPTION

Figure 1:
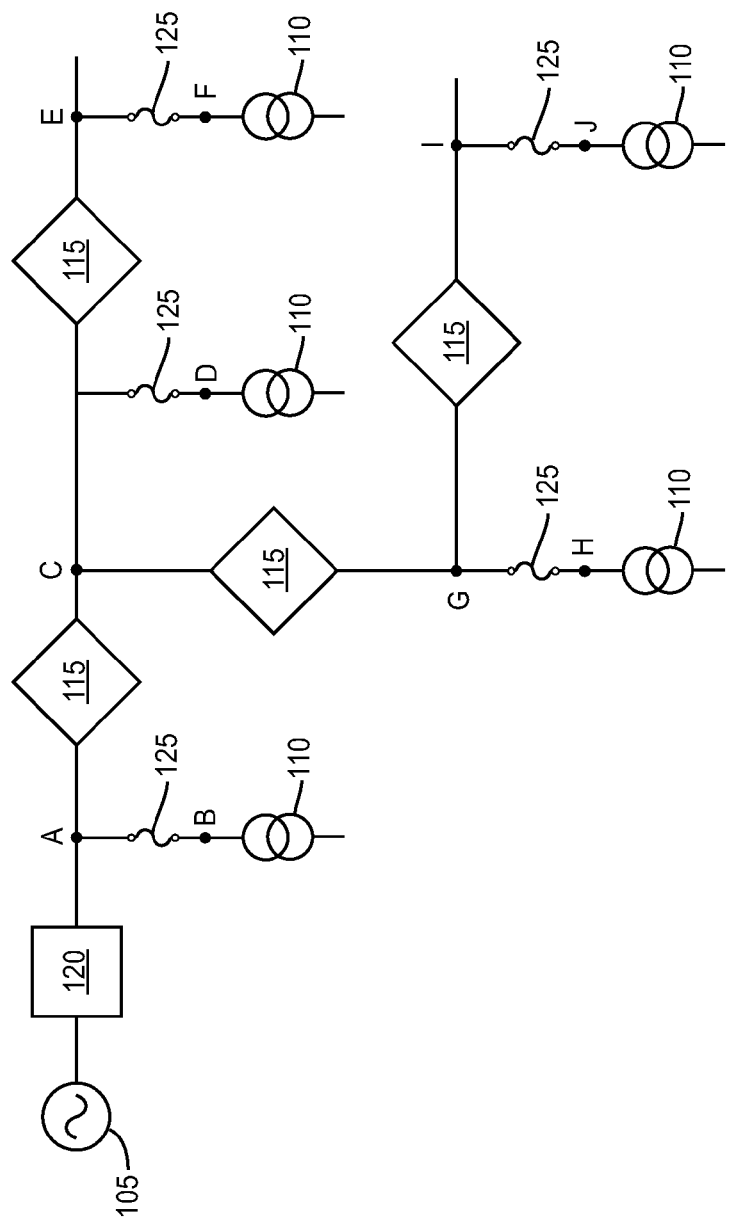
FIG. 1 is a schematic diagram illustrating a portion of an electrical power distribution system.

In the claims and discussion that follows, terms such as "first", "second", and the like, are used to differentiate between several similar elements, regions, sections, etc., and are not intended to imply a particular order or priority unless the context clearly indicates otherwise. Furthermore, as used herein, the terms "having", "containing", "including", "comprising" and the like are open-ended terms that indicate the presence of stated elements or features but that do not preclude additional elements or features. The articles "a", "an" and "the" are intended to include the plural as well as the singular, unless the context clearly indicates otherwise. Like terms refer to like elements throughout the description.

As noted above, the system flexibility provided by new smart grid technologies introduces some new problems in systems operation. In particular, automatic network reconfiguration may result in situations where Intelligent Electronic Devices (IEDs) such as substation relays and field reclosers that have been pre-configured to protect the system from abnormal conditions may no longer provide selective operation. In a new configuration created by an automatic recovery system, these devices may fail to operate during faults, or can mis-operate and create nuisance trips during normal operation conditions.

Traditionally, protection coordination analysis has been performed off-line, at the system planning stage. This approach is adequate when the system is operated in a fixed radial configuration. However, self-healing grids are more dynamic in nature and offer many more possible network configurations.

A few solutions existing today are capable of detecting some changes in network topology and modifying settings of IEDs. However, these solutions are implemented either at the substation level or as peer-to-peer systems, and do not include detailed protection coordination analysis based on a full network model. Also, these solutions are not capable of calculating the new settings in case the new topology is not covered by the pre-calculated Setting Groups.

The techniques described herein may be broadly referred to as "online protection coordination." These techniques, which can be executed during actual system operation, bridge the gap between planning and operations by automatically providing and improving upon functions traditionally done at the system planning stage.

The systems described herein are capable of analyzing a system's current network topology and all possible network topologies created as the result of automated grid switching. These systems can use a full network model to perform load flow, short-circuit and protection coordination analysis. This analysis may be followed by the automatic execution of required control actions, e.g., through the use of SCADA.

A primary purpose of the online protection coordination techniques and systems described herein is to avoid situations where protection devices are miscoordinated, as a result of system reconfiguration, and to ensure that protection selectivity is always maintained. The Online Protection Coordination Engine described herein will verify the selectivity of IEDs and fuses in normally open loop or multi-backfeed distribution system configurations, as represented by the Distribution Management System (DMS) model in real-time. This online protection coordination utilizes IED and fuse models that include all associated parameters, i.e. time-current characteristics, pickups, time delays, and reclosing settings, stored in the DMS database.

Key features of the online protection coordination techniques used in several embodiments of the present invention include automatic topology analysis, protection device modeling, short-circuit analysis, protection selectivity validation, multiple settings groups, and control actions. Each of these features is discussed in further detail below.

Topology analysis includes the identification of the source-to-load paths for the portion of the system that has to be coordinated. All fault protection devices in the path are also identified. Topology analysis is based on a full network model of the distribution system. As discussed in further detail below, in some cases the topology analysis is triggered by a restoration switching analysis that is in turn triggered by a fault in the power system network. In these cases, the topology analysis may be performed on a network model that reflects one or more network configurations that are potential outcomes of a restoration switching sequence.

FIG. 1 illustrates a simplified view of a portion of an electrical power distribution system that includes several fault protection devices that should be identified as part of the topology analysis; a corresponding network model used in the topology analysis stage includes information that represents the connections between the devices and that identifies the devices. The illustrated portion of the modeled network in this case includes a power source 105, which is connected to several loads 110 through electrical distribution lines. Several remotely controllable fault protection devices 115 are distributed throughout the distribution system. Also shown are other protection and/or isolation devices, including a breaker 120 and several load-protecting fuses 125.

Protection Device Modeling.

Once the relevant fault protection devices have been identified, the corresponding protection device settings are extracted from the database. In some cases, piece-wise linear or equation based time-current characteristics must be created for some or all of the protection devices. One or more remotely controllable fault protection devices may have multiple settings, each of which may have several different parameters, and each of which is manifested in a different time-current characteristic for the device.

Figure 2:
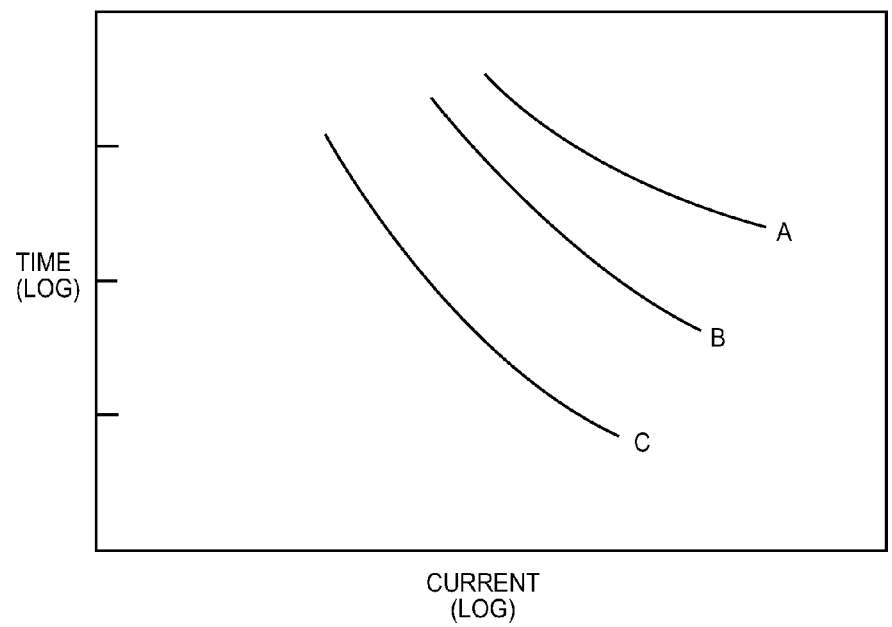
FIG. 2 illustrates examples of time-current characteristic curves for fault protection devices.

FIG. 2 illustrates a simplified view of several time-current characteristic for a fault protection device. For a given curve A, B, or C, the fault protection device is actuated by any combination of current and time that falls on the curve or above and to the right of the curve. Note that the three illustrated curves may represent time-current characteristics for each of three different fault protection devices, or may represent time-current characteristics for each of multiple pre-configured settings of a single device.

Short Circuit Analysis.

Fault currents at each of the protection devices in the network topology are calculated for each of several different types of faults in the area of interest, considering fault impedance. The short circuit analysis may be performed by successively assuming a fault at each node in the area of interest. For example, given the network model illustrated in FIG. 1, the short circuit analysis may proceed by assuming faults of several different types at each of nodes A-J. Fault types that are used in the analysis include three-phase faults, line-to-line faults, line-to-ground faults, and line-to-line-to-ground faults.

Protection Selectivity Validation.

A selectivity check is for each pair of protection devices that are adjacent to one another the area of interest, for each of the analyzed short-circuit scenarios. For example, the fault protection devices 115 between nodes A and C and between C and G are adjacent to each other; selectivity validation should thus be performed for this pair of devices based on short circuits occurring at node G. Likewise, the fault protection devices 115 between nodes A and C and between C and E are adjacent to each other, and thus selectivity validation should be performed for this pair of devices based on possible short circuits at node E.

The selectivity check may use a Coordination Time Interval (CTI) parameter that is specified, in some cases, by the system user. The CTI specifies a minimum time difference between the first possible activation of an upstream protection device and the latest possible activation of the neighboring downstream protection device, given a downstream fault. In some cases, different CTIs may apply to different types of protection devices and/or to different parts of the network. Various coordination checks can also be configured by the system user or by the system configuration: Phase, Ground, or both Phase and Ground coordination. Instantaneous and time-delayed overcurrent elements are considered, in some systems. The number of reclosing attempts and the reclose intervals for devices capable of reclosing, and the fuse saving/fuse blowing protection philosophies may also be considered.

Settings/Multiple Setting Groups.

The Online Protection Coordination module will iterate through the settings of multiple pre-configured setting groups until it finds one or more Setting Group (SG) with no selectivity violations. In the event that all pre-configured Setting Groups have some violations, a Setting Group with minimum number of violations can be selected. Alternatively, the event that all pre-configured Setting Groups have some violations, the time current curves of one or more protection devices that allow modification (e.g., reclosers and relays) are modified to provide sufficient selectivity with respect to the CTI. The modification may include shifting the TCCs with respect to time or modifying the pickups of the IED protection elements. The maximum clearing times are determined based on the distribution equipment thermal damage curves, or can be specified by the user.

Control Action.

Commands to activate the Setting Group with no violations determined at the previous step are sent to the field devices. SCADA may be used for this purpose. Alternatively, the new settings can also be sent to the field devices via SCADA as setpoints or using file transfer mechanism.

The Online Protection Coordination process described above can be executed manually by the operator, or automatically as a part of the Restoration Switching Analysis (RSA). RSA performs automatic analysis of the system configuration and determines the switching sequence to restore an outage.

If the Protection Coordination process is triggered manually, the area of interest is determined by the operator. All connected components in the area are considered. In the event that the Protection Coordination process is triggered by RSA, the following process is followed, in some systems:

1. The RSA plan pointer is passed to the protection coordination engine. This allows the protection coordination engine to identify the network or network portion that is the subject of the RSA plan and to retrieve and/or create the corresponding network topology model.
2. Based on the RSA plan as applied to the network mode, the protection coordination process opens the Fault Isolation Device and closes the Restoration Switching Device from the RSA plan. In effect, the protection coordination engine is performing the restoration switching plan on the network model.
3. The protection coordination engine performs topology analysis and the protection coordination process outlined above.
4. The protection coordination closes the Fault Isolation Device and opens the Restoration Switching Device from the RSA plan in memory to revert the network model back to the original configuration.

Details of one example embodiment of the process outlined generally above are given below.

After the topology of interest for the Protection Coordination Engine is determined, the resulting components array is scanned and the protection devices are identified and stored in memory. Then, the path back to the source is traced within the protection device array and the upstream (source-side)/downstream (load-side) protection device pairs are identified in the path back to the source. If a feeder has multiple laterals or branches with protection devices, they are also considered by the search. Protection devices may be identified by the component category attributes: Fuse, Recloser, or Relay. The resulting array of pointers to protection device pairs is used as input into the system coordination function.

The coordination checks are performed as follows. The operation times of the upstream and downstream protection devices are compared with respect to the fault currents determined from the short-circuit analysis in order to make sure that the downstream device operates first, and the specified margin (Coordination Time Interval) between the upstream and downstream operation times is maintained.

Exceptions are several special cases when the IED capable of reclosing is located upstream and the fuse is downstream, where a 'fuse saving' scheme is employed. In this case the upstream IED must clear temporary faults before the downstream fuse is blown. However, if the fault is permanent, the downstream fuse must clear it.

The operation time for a specific current level is determined from a piece-wise linear representation of the Time-Current Characteristic (TCC) by logarithmic interpolation, or from equations representing the TCC for the standard IEC/ANSI curve-based TCCs.

Overall, for each device pair, multiple (e.g., six) coordination checks are performed for the current points, equally spaced in the range from the TCC curve minimum current to the fault current from the short-circuit analysis. If the coordination condition is violated at any of these points, the device pair is marked as uncoordinated.

Figure 3:
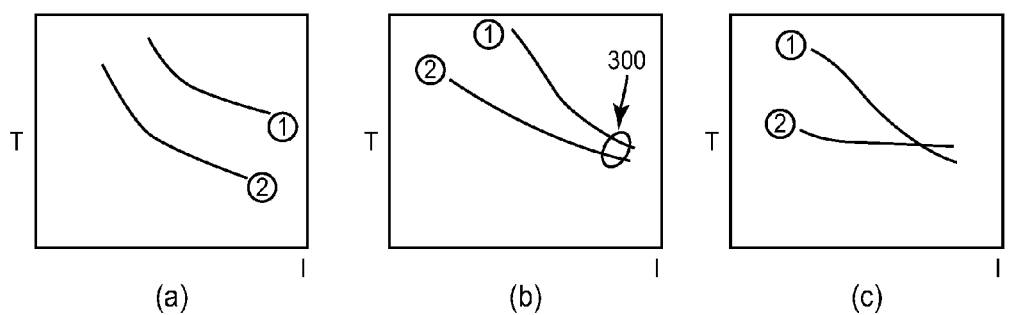
FIGS. 3(a), 3(b) and 3(c) show coordinated, CTI-violation, and overlapping-curve conditions, respectively.

The coordination check result for each device pair can be as follows:
  Coordinated.
  CTI violation.
  Curve Overlap.
FIG. 3 illustrates examples of each of these situations. In each of FIGS. 3(a), 3(b), and 3(c), the curve labeled "1" is the time-current characteristic for an upstream device of a pair of fault protection devices, while the curve labeled "2" is the time-current characteristic for the downstream device of the pair. FIG. 3(a) illustrates a pair of characteristic curves representing a coordinated scenario, i.e., where the curve for the upstream device is above that of the downstream device, and is separated at each current by a time margin that equals or exceeds the CTI. FIG. 3(b) illustrates a pair of characteristic curves where selectivity is maintained, but where there is a CTI violation. At region 300, the curves 1 and 2 are closer to one another than the minimum CTI. Finally, FIG. 3(c) illustrates a curve overlap violation. For any current that is greater than the crossover point, there is no selectivity. In other words, the upstream device will be activated first in the event of a fault resulting in currents to the right of the crossover point.

If CTI violations and/or Curve Overlaps are found, the settings from the next Setting Group are extracted from the database and the coordination process is repeated until a SG with no violations is found (all device pair coordination checks return Coordinated). Fuse-fuse violations may be counted separately and reported as a warning.

If all SGs have coordination violations, a time multiplier may be applied to the upstream device in the uncoordinated pair. Alternatively, a new pickup for the upstream device may be calculated based on power flow/short-circuit analysis for the new topology. In this case the maximum bound for the TCC multiplier is determined based on the thermal damage curve of the upstream component.

The coordination techniques described above may also be expanded to include additional protection elements: under- and over-voltage, under- and over-frequency and directional overcurrent. Additionally, maximum clearing times for particular network configurations may be determined, in some systems, based on contingency analysis (critical clearing time). These times may be substantially faster than the thermal equipment damage curves as the penetration of distributed energy generation increases in the future. This will require running phasor-based stability analysis on DMS platform in real-time.

Figure 4:
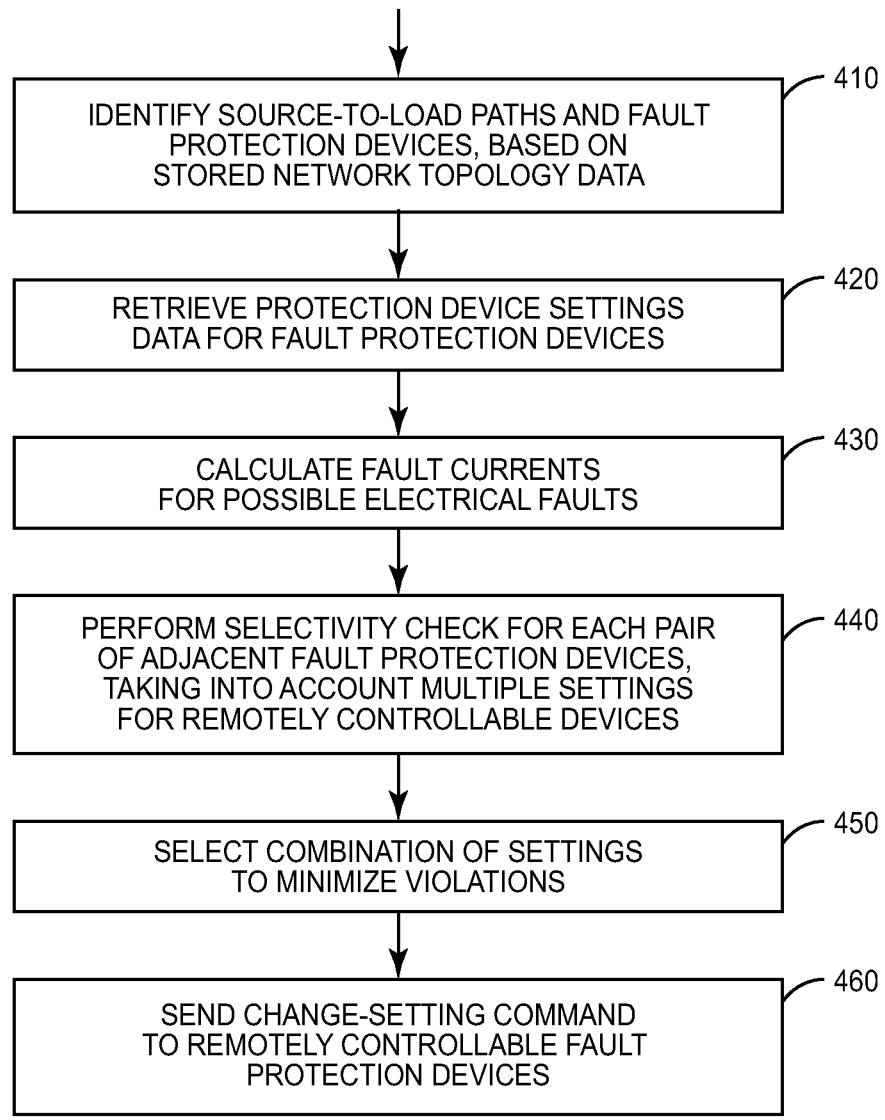
FIG. 4 is a process flow diagram illustrating an example method for automatic protection coordination.

FIG. 4 is a process flow diagram illustrating a generalized example of the Online Protection Coordination process described above. More particularly, FIG. 4 illustrates a method for automatic protection coordination in a power system network that includes one or more power sources and multiple fault protection devices, wherein a plurality of the fault protection devices are remotely controllable and have multiple preconfigured settings.

The illustrates process begins, as shown at block 410, with identifying radial source-to-load paths and fault protection devices in said source-to-load paths, for a portion of the power system network to be coordinated. This identification operation is based on stored topology data for the network, and may in some cases be based on a network model topology that reflects a change or proposed change to the network configuration resulting from an automatic restoration process. Accordingly, the identifying operation shown in block 410 may in some cases be performed in response to an outage event in the power system network.

As shown at block 420, the process continues with retrieving protection device settings data for the identified fault protection devices in the relevant portion of the network, including the pre-configured setting groups for any remotely controllable fault protection devices. Thus, the protection device settings data for identified fault protection devices may comprise only a single time-current characteristic for some non-remotely controllable fault protection devices, but comprise two or more distinct time-current characteristics for each of several remotely controllable fault protection devices, where each of the two or more time-current characteristics for these remotely controllable fault protection device corresponds to one of the multiple preconfigured settings for the corresponding device.

These protection device settings are then used to calculate predicted fault currents for each of a plurality of possible electrical faults in said portion of the power system network, based on the stored topology data, as shown at block 430. In some cases, this includes predicting fault currents for each of a plurality of fault types at each of a plurality of nodes in the portion of the network to be coordinated. These fault types may include some or all of the following: a three-phase fault; a line-to-line fault; a line-to-ground fault; and a line-to-line-to-ground fault.

As shown at block 440, a selectivity check is performed for each pair of fault protection devices that are adjacent to one another in an identified radial source-to-load path, for each of one or more of the predicted fault currents, taking into account the multiple preconfigured settings for the remotely controllable fault protection devices. For a given pair of fault protection devices where each has multiple preconfigured settings, this may comprise identifying all combinations of settings for the pair that do not present a selectivity violation. In some systems, the selectivity check involves evaluating selectivity at each of multiple currents in a range extending up to the predicted fault current, for at least one pair of devices and for at least one predicted fault current. Further, in some systems the selectivity check performed for at least one pair of fault protection devices is based on a pre-determined coordination time interval, where the coordination time interval defines a minimum time separation between time-current characteristics of coordinated devices at each predicted fault current.

The results of these selectivity checks are used to select a combination of settings for remotely controllable fault protection devices, as shown at block 440. A combination of settings that minimizes selectivity violations among the pairs is selected. If possible, a combination for which no selectivity violations exist is chosen. If no such combination exists, then a combination that minimizes an aggregate violation of coordination time intervals is selected, in some systems. In other systems, a combination for which a minimum number of selectivity violations exist is selected, instead. Some systems may be configured to, after determining that there is no combination for which no selectivity violations exist, select a combination for which a minimum number of selectivity violations exist and generate a suggested new setting for a first one of the remotely programmable fault protection devices, wherein said suggested new setting would reduce the number of selectivity violations. In some cases this suggested new setting is sent to a system operator. Other systems may be configured to automatically proceed with sending a reconfiguration command to the remotely programmable fault protection device, to set the first one of the remotely programmable fault protection devices to the new setting.

Finally, as shown at block 460, a change-setting command is sent to each of the remotely controllable fault protection devices for which settings have changed, based on the selected combination of settings. The change-setting commands may be sent using SCADA, for example.

As noted above, the process illustrated in FIG. 4 may be triggered by a restoration switching process. Thus, for example, the process shown in FIG. 4 may be preceded, in some cases, by the detecting of a fault in the power system network and the automatic generating of a restoration switching sequence plan, based on the identified fault. In these cases, the identifying, calculating, performing, selecting and sending operations shown in FIG. 4 are performed in response to said detecting and are based on stored topology data that reflects network changes due to the restoration switching sequence plan.

Figure 5:
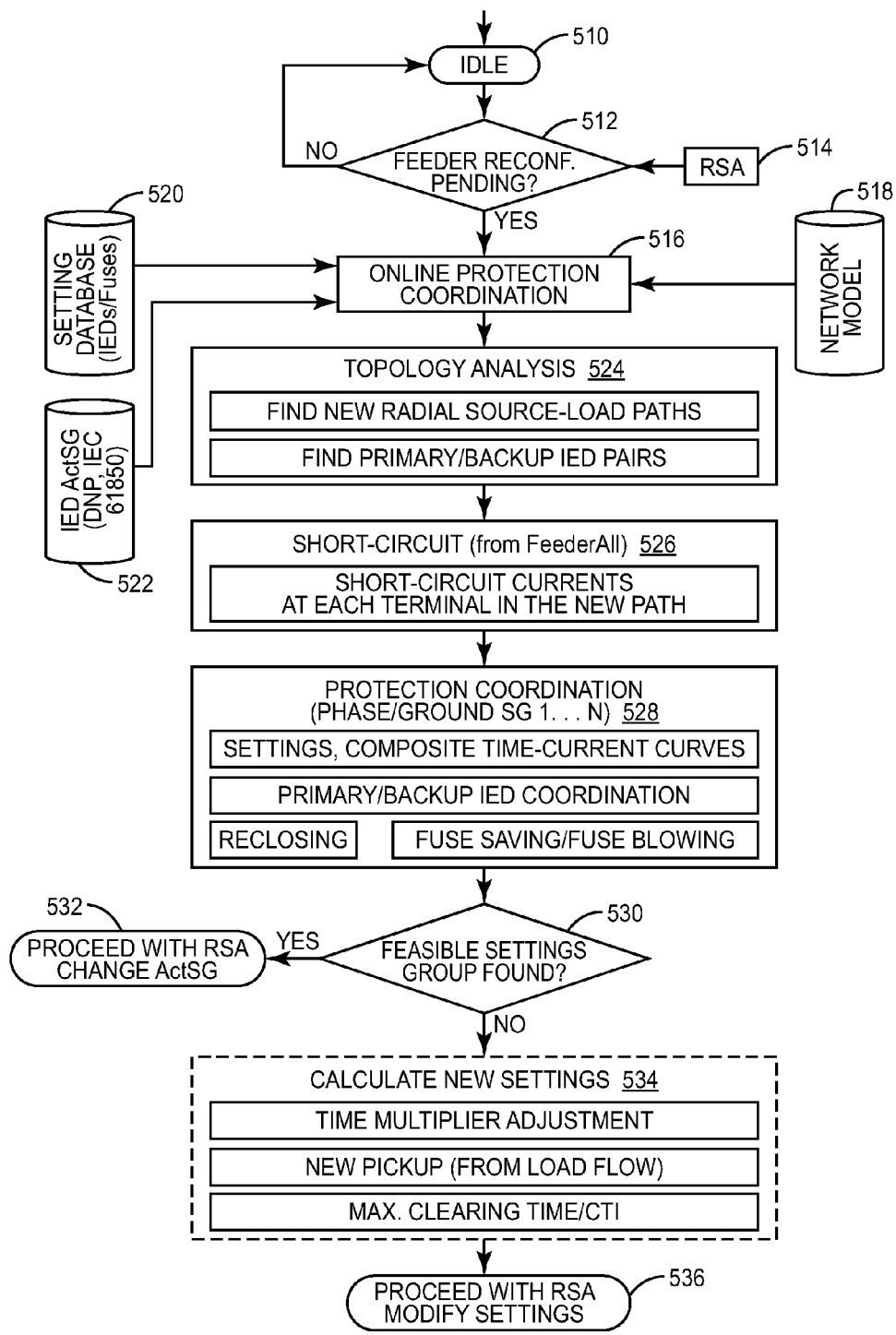
FIG. 5 is a process flow diagram illustrating another example method for automatic protection coordination.

An example of this approach is shown in FIG. 5, which is a more detailed process flow diagram than FIG. 4, illustrating an example process that is initiated by a Restoration Switching Analysis (RSA). As shown at blocks 510 and 512, the process "idles" until the system determines that a feeder reconfiguration is pending, based on a trigger received from RSA module 514. The system then initiates the Online Protection Coordination process, as shown at block 516. Inputs to this process include the network model 518, a settings database 520, and an Intelligent Electronic Devices (IED) communications database 522, which includes information regarding communications with remotely controllable IEDs, e.g., using the well-known DNP and/or IEC 61850 protocols.

The Online Protection Coordination process continues with topology analysis, as shown at block 524, short-circuit analysis, as shown at block 526, and a protection coordination phase, as shown at block 528. In this latter phase, the system searches for a combination of settings that minimizes selectivity violations. As shown at block 530, if a feasible settings group is found, then the system proceeds with the RSA plan, sending any necessary new settings to the affected protection devices as shown at block 532. If no feasible settings group is found, on the other hand, then the system calculates new settings, as shown at block 534. This may involve applying a time multiplier adjustment to one or more time-current characteristics for a fault protection device, or establishing a new pickup (i.e., a new threshold for the fault protection device) based on the load flow currents calculated for the new topology, or adjusting a maximum clearing time or CTI. As shown at block 536, the system then proceeds with the RSA, after the modified settings are applied.

Figure 6:
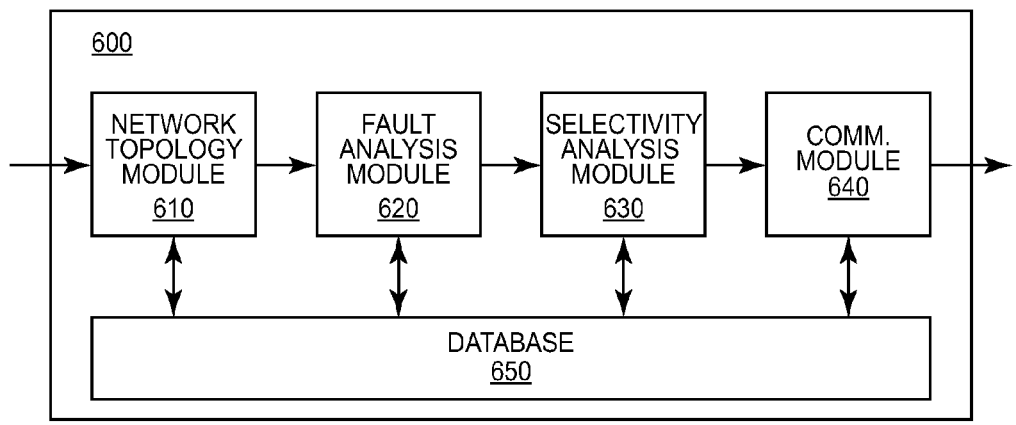
FIG. 6 is a block diagram illustrating components of an apparatus for automatic protection coordination.
Figure 7:
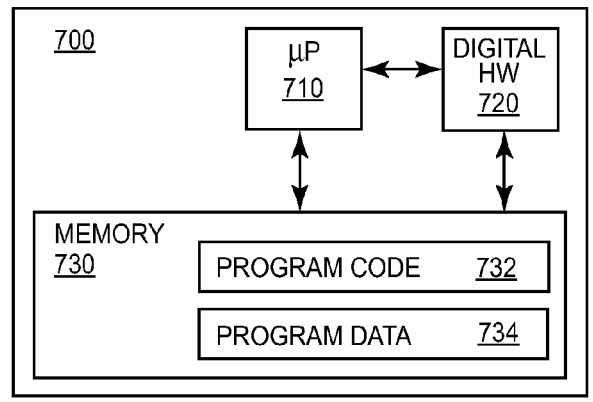
FIG. 7 shows an example processing element configured according to some embodiments of the present invention.

FIGS. 6 and 7 are block diagrams illustrating basic features of a computerized system for performing automatic protection coordination according to the techniques described above. FIG. 6 provides a functional view of the system, including a number of functional modules. It will be appreciated that each of these functional modules may be implemented through the use of one or more appropriately programmed processor elements, which may or may not be co-located. Furthermore, two or more of the functional modules may share a processor element.

As seen in FIG. 6, an example computerized system 600 for performing automatic protection coordination includes a network topology module 610, a fault analysis module 620, a selectivity analysis module 630, and a communications module 640. System 600 further includes a computerized database 650, which includes, among other things, a network model for the distribution network of interest and a database of settings information for protection devices in the network. Note that database 650 may comprise one or several different memory devices, of any of a number of different types. In various systems, some, all, or none of these memory devices are physically co-located with the other components of system 600; thus, database 650 may be contained completely in data storage that is local to a self-contained protection coordination, or may be distributed across various nodes in a data network, or some combination of both.

Network topology module 610 is configured to identify radial source-to-load paths and fault protection devices in said source-to-load paths, for a portion of the power system network to be coordinated. This is based on topology data for the network, stored in database 650. Fault analysis module 620 is configured to calculate predicted fault currents for each of a plurality of possible electrical faults in said portion of the power system network, again based on the stored topology data.

Selectivity analysis module 630 is configured to retrieve protection device settings data for each of the identified fault protection devices, including the pre-configured setting groups for remotely controllable fault protection devices, and to perform a selectivity check for each pair of fault protection devices that are adjacent to one another in an identified radial source-to-load path, for each of one or more of the predicted fault currents. This selectivity check takes into account settings in the pre-configured setting groups for remotely controllable fault protection devices. Selectivity analysis module 630 then selects a combination of settings for the remotely controllable fault protection devices, based on the selectivity check, to minimize selectivity violations among the pairs. Communications module 640 is configured to send a change-setting command to remotely controllable fault protection devices for which settings have changed, based on the selected combination of settings. Communications module 640 may be configured to use the DNP and/or IEC 61850 protocols, for example.

It should be appreciated that each of the variations discussed above for the process flow diagrams of FIGS. 4 and 5 are equally applicable to the protection coordination system 600 shown in FIG. 6. It should also be appreciated that system 600 may be implemented as a local, stand-alone system, in some cases, or in a distributed fashion, where the various functional modules shown in FIG. 6 are implemented using two or more physically separated nodes communicating with one another through a data network. In either case, the functional modules shown in FIG. 6 may be implemented using one, two, or more distinct processor elements.

FIG. 7 is a block diagram illustrating an example configuration for a processing element 700, which may be used to implement all or a portion of an online protection coordination system. The pictured example includes one or more microprocessors or microcontrollers 710, as well as other digital hardware 720, which may include digital signal processors (DSPs), special-purpose digital logic, and the like. Either or both of microprocessor(s) 710 and digital hardware 720 may be configured to execute program code 732 stored in memory 730 along with program data 734. Because the various details and engineering tradeoffs associated with the design of processing circuits are well known and are unnecessary to a full understanding of the invention, additional details are not shown here.

The program code 732 stored in memory circuit 730, which may comprise one or several types of memory such as read-only memory (ROM), random-access memory, cache memory, flash memory devices, optical storage devices, etc., includes program instructions for carrying out the sub-system estimation/prediction techniques described above, in several embodiments. The program data 734 include various pre-determined system configuration parameters as well as parameters determined from system measurement.

Detailed examples of several embodiments of the present invention have been described above, including detailed techniques for automatic online protection coordination in a Distribution Management System (DMS). In some embodiments, these techniques use a DMS network model to analyze currents and all possible network topologies created as the result of automated grid switching, and perform load flow, short-circuit and protection coordination analysis. These embodiments can be used to address problems arising from automatic network reconfiguration, such as situations where IEDs such as substation relays and field reclosers that have been pre-configured to protect the system from abnormal conditions may no longer provide selective operation.

Of course, it should be understood that the present invention is not limited by the foregoing description, nor is it limited by the accompanying drawings. Instead, the present invention is limited only by the following claims and their legal equivalents.

What is claimed is:

1. A method for automatic protection coordination in a power system network that includes one or more power sources and multiple fault protection devices, wherein a plurality of the fault protection devices are remotely controllable and have multiple preconfigured settings, the method comprising:
    identifying radial source-to-load paths and fault protection devices in said source-to-load paths, for a portion of the power system network to be coordinated, based on stored topology data for said portion;
    retrieving protection device settings data for identified fault protection devices, including the multiple preconfigured settings for remotely controllable fault protection devices in said portion of the power system network;
    calculating predicted fault currents for each of a plurality of possible electrical faults in said portion of the power system network, based on the stored topology data;
    performing a selectivity check for each pair of fault protection devices that are adjacent to one another in an identified radial source-to-load path, for each of one or more of the predicted fault currents, taking into account multiple preconfigured settings for remotely controllable fault protection devices;
    selecting a combination of settings for remotely controllable fault protection devices, based on the selectivity check, to minimize selectivity violations among the pairs;
    sending a change-setting command to remotely controllable fault protection devices for which settings have changed, based on the selected combination of settings.

2. The method of claim 1, further comprising identifying the portion of the power system network to be coordinated in response to an outage event in the power system network.

3. The method of claim 1, wherein the protection device settings data for identified fault protection devices comprise a single time-current characteristic for each of a plurality of non-remotely controllable fault protection devices and two or more time-current characteristics for each remotely controllable fault protection devices, each of the two or more time-current characteristics for each remotely controllable fault protection device corresponding to one of multiple preconfigured settings for the remotely controllable fault protection device.

4. The method of claim 1, wherein calculating predicted fault currents for each of a plurality of possible electrical faults in said portion of the power system network comprises predicting fault currents for each of a plurality of fault types at each of a plurality of nodes in the portion of the network to be coordinated.

5. The method of claim 4, wherein the plurality of fault types includes one or more fault types selected from the group consisting of:
    a three-phase fault;
    a line-to-line fault;
    a line-to-ground fault; and
    a line-to-line-to-ground fault.

6. The method of claim 1, wherein performing the selectivity check for each pair of fault protection devices that are adjacent to one another in an identified radial source-to-load path comprises, for at least one pair, identifying all combinations of settings for the pair that do not present a selectivity violation.

7. The method of claim 1, wherein performing the selectivity check for each pair of fault protection devices comprises, for at least one pair and one predicted fault current, evaluating selectivity at each of multiple currents in a range extending up to the predicted fault current.

8. The method of claim 1, wherein performing the selectivity check for each pair of fault protection devices is based on a pre-determined coordination time interval, wherein the coordination time interval defines a minimum time separation between time-current characteristics of coordinated devices at each predicted fault current.

9. The method of claim 1, wherein selecting the combination of settings to minimize selectivity violations among the pairs comprises selecting a combination for which no selectivity violations exist or, if no such combination exists, selecting a combination that minimizes an aggregate violation of coordination time intervals.

10. The method of claim 1, wherein selecting the combination of settings to minimize selectivity violations among the pairs comprises selecting a combination for which no selectivity violations exist or, if no such combination exists, selecting a combination for which a minimum number of selectivity violations exist.

11. The method of claim 10, further comprising:
    determining that there is no combination for which no selectivity violations exist;

selecting a combination for which a minimum number of selectivity violations exist; and generating a suggested new setting for a first one of the remotely programmable fault protection devices, wherein said suggested new setting would reduce the number of selectivity violations.

12. The method of claim 11, further comprising sending one or more reconfiguration commands to the first one of the remotely programmable fault protection devices to set the first one of the remotely programmable fault protection devices to the new setting.

13. The method of claim 1, further comprising first detecting a fault in the power system network and automatically generating a restoration switching sequence plan, based on the identified fault, wherein said identifying, calculating, performing, selecting and sending operations are performed in response to said detecting and are based on stored topology data that reflects network changes due to the restoration switching sequence plan.

14. A computerized automatic protection coordination system for use in a power system network that includes one or more power sources and multiple fault protection devices, wherein a plurality of the fault protection devices are remotely controllable and have multiple preconfigured settings, the system including:
a network topology analysis module configured to identify radial source-to-load paths and fault protection devices in said source-to-load paths, for a portion of the power system network to be coordinated, based on stored topology data for said portion;
a fault analysis module configured to calculate predicted fault currents for each of a plurality of possible electrical faults in said portion of the power system network, based on the stored topology data;
a selectivity analysis module configured to
retrieve protection device settings data for each of the identified fault protection devices, including the multiple preconfigured settings for remotely controllable fault protection devices in said portion of the power system network,
perform a selectivity check for each pair of fault protection devices that are adjacent to one another in an identified radial source-to-load path, for each of one or more of the predicted fault currents, taking into account the multiple preconfigured settings for remotely controllable fault protection devices, and
select a combination of settings for the remotely controllable fault protection devices, based on the selectivity check, to minimize selectivity violations among the pairs; and
a communications module configured to send a change-setting command to remotely controllable fault protection devices for which settings have changed, based on the selected combination of settings.

15. The computerized automatic protection coordination system of claim 14, wherein the network topology analysis module is further configured to identify the portion of the power system network to be coordinated in response to an outage event in the power system network.

16. The computerized automatic protection coordination system of claim 14, wherein the protection device settings data for identified fault protection devices comprise a single time-current characteristic for each of a plurality of non-remotely controllable fault protection devices and two or more time-current characteristics for each remotely controllable fault protection devices, each of the two or more time-current characteristics for each remotely controllable fault protection device corresponding to one of multiple pre-configured settings for the remotely controllable fault protection device.

17. The computerized automatic protection coordination system of claim 14, wherein the fault analysis module is configured to calculate predicted fault currents for each of a plurality of possible electrical faults by predicting fault currents for each of a plurality of fault types at each of a plurality of nodes in the portion of the network to be coordinated.

18. The computerized automatic protection coordination system of claim 14, wherein the selectivity analysis module is configured to perform the selectivity check for each pair of fault protection devices that are adjacent to one another in an identified radial source-to-load path by, for at least one pair, identifying all combinations of settings for the pair that do not present a selectivity violation.

19. The computerized automatic protection coordination system of claim 14, wherein the selectivity analysis module is configured to perform the selectivity check for each pair of fault protection devices by, for at least one pair and one predicted fault current, evaluating selectivity at each of multiple currents in a range extending up to the predicted fault current.

20. The computerized automatic protection coordination system of claim 14, wherein the selectivity analysis module is configured to perform the selectivity check for each pair of fault protection devices based on a pre-determined coordination time interval, wherein the coordination time interval defines a minimum time separation between time-current characteristics of coordinated devices at each predicted fault current.

21. The computerized automatic protection coordination system of claim 14, wherein the selectivity analysis module is configured to select the combination of settings to minimize selectivity violations among the pairs by selecting a combination for which no selectivity violations exist or, if no such combination exists, selecting a combination that minimizes an aggregate violation of coordination time intervals.

22. The computerized automatic protection coordination system of claim 14, wherein the selectivity analysis module is configured to select the combination of settings to minimize selectivity violations among the pairs by selecting a combination for which no selectivity violations exist or, if no such combination exists, selecting a combination for which a minimum number of selectivity violations exist.

23. The computerized automatic protection coordination system of claim 10, wherein the selectivity analysis module is further configured to:
determine that there is no combination for which no selectivity violations exist;
select a combination for which a minimum number of selectivity violations exist; and
generate a suggested new setting for a first one of the remotely programmable fault protection devices, wherein said suggested new setting would reduce the number of selectivity violations.

24. The computerized automatic protection coordination system of claim 23, wherein the communications module is further configured to send one or more reconfiguration commands to the first one of the remotely programmable fault protection devices to set the first one of the remotely programmable fault protection devices to the new setting.

25. The computerized automatic protection coordination system of claim 14, further comprising a fault recovery module configured to:
detect a fault in the power system network;

automatically generate a restoration switching sequence plan, based on the identified fault; and inform the network topology analysis module of the restoration switching sequence;

wherein the network topology analysis module, fault analysis module, and selectivity analysis module are configured to operate, in response to said informing, on stored topology data that reflects network changes due to the restoration switching sequence.

* * * * *